Aug. 22, 1933.         J. C. DIEHL              1,923,356
                         METER
              Filed May 8, 1928           2 Sheets-Sheet 1
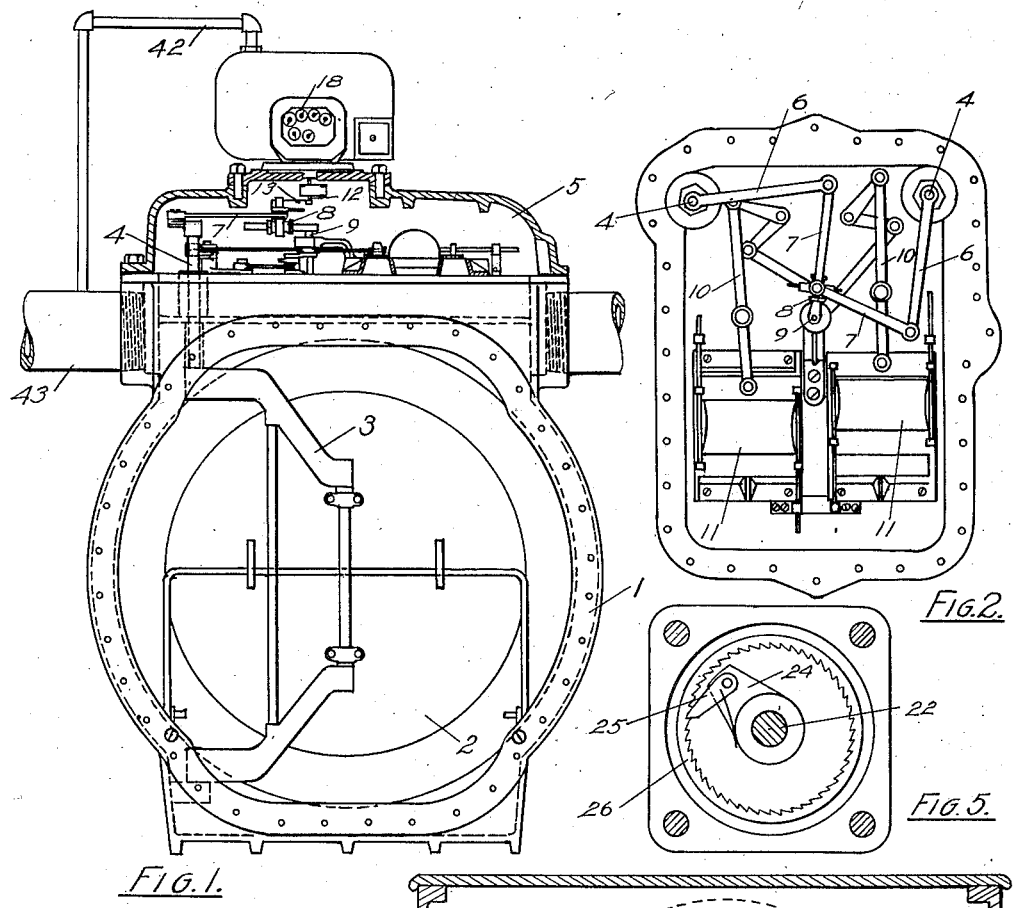
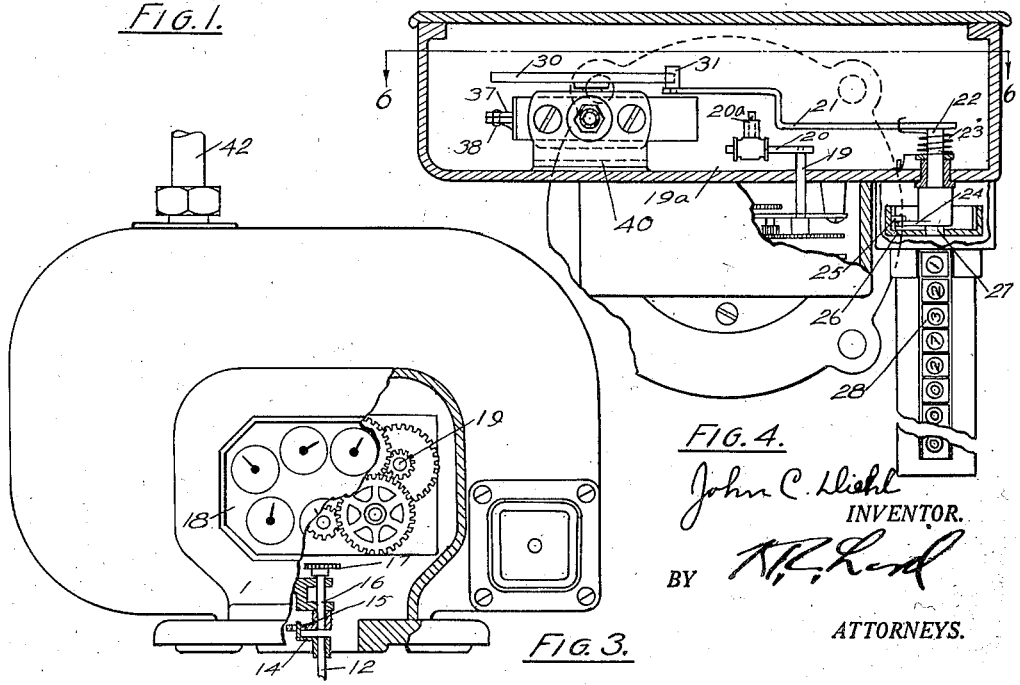
John C. Diehl
INVENTOR.
BY
ATTORNEYS.

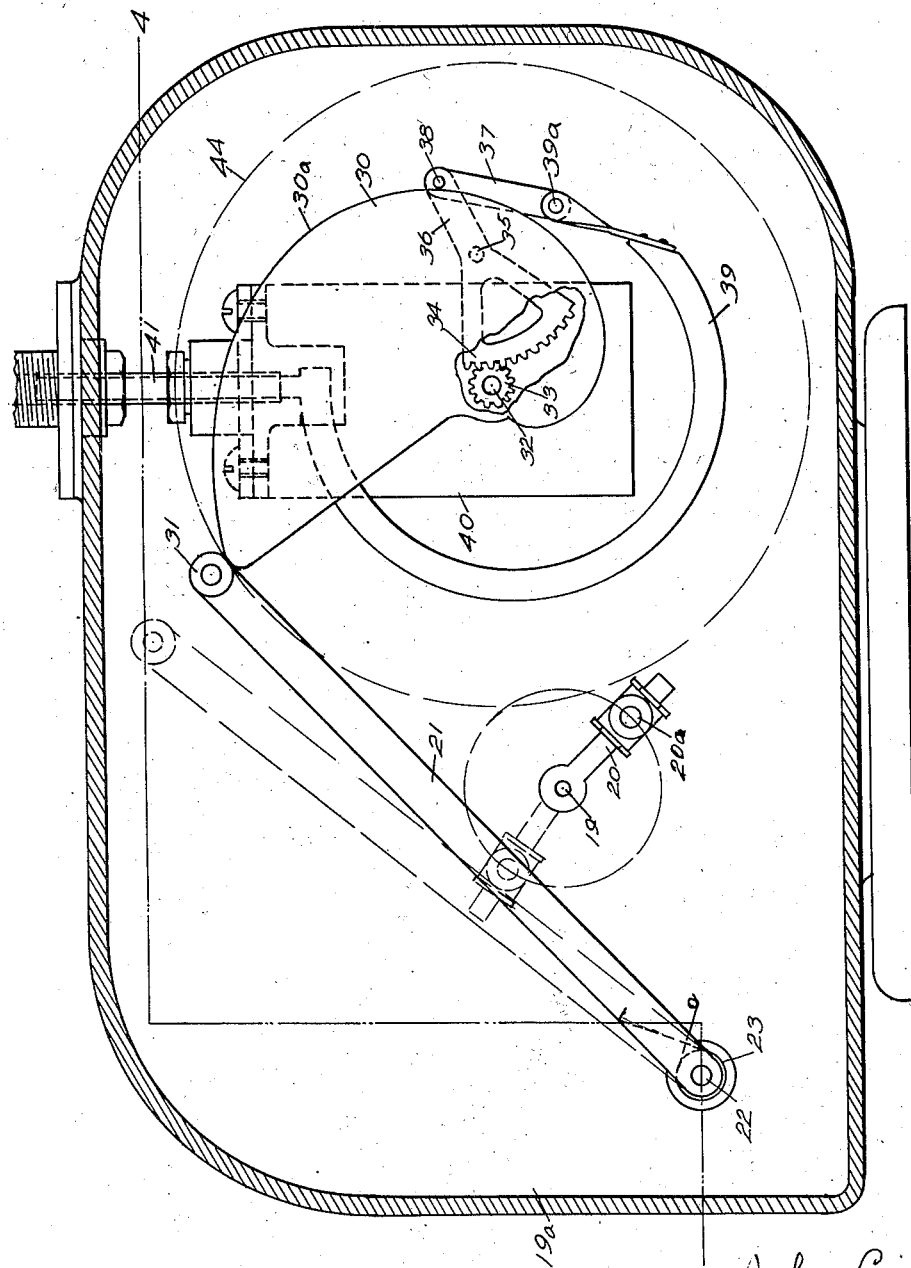

Patented Aug. 22, 1933

1,923,356

UNITED STATES PATENT OFFICE 1,923,356

METER

John C. Diehl, Erie, Pa., assignor to American Meter Company, New York, N. Y., a Corporation of Delaware Application May 8, 1928. Serial No. 276,095

5 Claims. (Cl. 73—1)

The invention is particularly directed to displacement meters. Such meters have ordinarily been supplied with registers which, responding to the action of the meter, register the volume of fluid, such as gas or air, passing through the meter, the meter expressing volume only without regard to pressure actual quantity. The customary unit is a cubic foot at a definite temperature and definite pressure. The definite pressure is usually atmospheric pressure, or slightly above atmospheric pressure.

Obviously if the pressure is increased, more than a standard foot passes through the meter for each foot registered, and inversely, when the pressure falls below the pressure of the standard foot the register indicates a greater number of feet than the standard foot of gas, or air, that has passed the meter. It is not unusual to supply such meters with pressure recording devices, which, operating in conjunction with the ordinary register makes it possible to calculate the standard number of feet, or actual quantity of gas or air which may have passed the meter.

The present invention is designed to obviate this difficulty. In carrying out the invention the connection communicating the movement from the metering mechanism to the register is varied in response to pressure changes so that the movement of the register relatively to the metering means is varied in accordance with the variations of pressure so that the register indicates not the volume passing the meter but the standard feet of actual quantity passing the meter. Features and details of the invention will appear more fully from the specification and claims.

A preferred embodiment of the invention is illustrated in the accompanying drawings as follows:—

Fig. 1 shows a meter, partly in section, and with the cover of the meter case removed.

Fig. 2 a plan view of the valve chamber with the cover of the chamber removed.

Fig. 3 an elevation of the chamber carrying the registering mechanism, partly in section.

Fig. 4 a section on the line 4—4 in Fig. 6.

Fig. 5 a detail view of a ratchet mechanism.

Fig. 6 a section on the line 6—6 in Fig. 4.

1 marks the meter case, 2 a bellows in the case, 3 the bellows arm, and 4 a shaft communicating the movement of the bellows to the valve chamber 5. It will be understood that there are two of these bellows and two of the shafts 4, each having a rock arm 6. The rock arms 6 are connected by links 7 with a crank 8. The crank 8 is mounted on a shaft 9. The shaft 9 through linkage 10 drives valves 11. This link mechanism and valve mechanism is of common construction. A shaft 12 is arranged in alinement with the shaft 9 and is driven with the crank 8 by an arm 13. The shaft 12 is provided with a crank 14 (see Fig. 3) which drives an arm 15 on a shaft 16 of the registering mechanism. Registering gears 17 operate the usual registering gears having their indications on a dial 18. A shaft 19 is driven from this gearing and passes into a chamber 19a. A crank 20 is mounted on the shaft 19 and is rotated thereby. This crank is provided with a roller-covered pin 20a which engages an oscillating arm 21 and moves this arm to a definite point at one end of its oscillating path. The arm 21 is mounted on a shaft 22 and is given a return movement by a spring 23. A ratchet arm 24 is mounted on the shaft 22 and carries a pawl 25 acting on a ratchet wheel 26. The ratchet wheel is mounted on a shaft 27, the shaft 27 being the driving shaft of a register 28, the register indicating the number of revolutions of the shaft and indicating by its reading the quantity as distinguished from the volume passing through the meter.

A cam-shaped plate 30, or a plate having varying radii engages a roller 31 on the end of the arm 21 and limits the return movement of this arm. The plate 30 is mounted on a shaft 32 and a gear 33 is fixed on the shaft 32. The gear 33 meshes with a segment 34. The segment is pivotally mounted at 35 and has an extending arm 36. A link 37 is connected with the arm 36 by a pin 38 and the opposite end of the link is connected by a pin 39a with a Bourdon tube 39. The Bourdon tube is mounted on a plate 40 and this plate has a passage communicating with the Bourdon tube, which passage is connected by a nipple 41 with a pipe 42, the pipe 42 leading to a pipe 43 carrying the gas to, or from the meter.

In the operation of the device, the crank 20 forces the oscillating arm outwardly to a definite limit of the travel, this being dependent on the throw of the crank which may be adjusted. The return movement of the arm 21 is accomplished under the influence of the spring 23 and this return movement is limited by the engagement of the roller 31 with the plate 30 and this return movement is varied as the position of the plate 30 is limited because the working surface, or face, 30a of this plate varies from an arc of a circle 44 with the pivot of the shaft 32 as a center as the absolute pressure of the metered fluid varies, the Bourdon tube and the communicating mechanism being varied and adjusted with relation to the shape of the working face 30a to accomplish this purpose. When the pressure is low, the plate 30 is swung so that the longer radius of the working edge 30a is in position to receive the roller 31. Consequently the return movement is arrested with less travel from the fixed outward position and this diminished travel is communicated through the ratchet mechanism to the register, registering the smaller number of feet. When, however, the pressure rises and swings the plate 30 so as to bring portions of the working surface 30a of shorter radius in the path of the roller 31 there is a corresponding greater return movement of the arm 21 from the fixed outer position to which it is driven by the crank and this greater movement is communicated through the ratchet mechanism to the register registering a relatively greater number of feet than the same movements of the metering mechanism would register with the plate swung to a position interposing a longer radius limiting the return movement of the arm. Thus the registering mechanism is made to vary in its response to the metering mechanism in accordance with the variations of pressure in the pressure device and registers the standard feet of actual quantity passing the meter rather than the volume.

What I claim as new is:—

1. In a meter, the combination of a fluid volume metering means; a register; a connection between the means and the register communicating movement to the register in response to movements of the means and comprising a crank driven by the metering means and an arm engaged and driven by the crank in one direction to a fixed point of travel at one end of its path; a spring returning the arm; a pressure device responsive to the pressure of the metered fluid; mechanism acting in response to the device and varying the return movement of the arm as the pressure varies; and means responsive to the movement of the arm and operating the register.

2. In a meter, the combination of a fluid volume metering means; a register; a connection between the means and the register communicating movement to the register in response to movements of the means and comprising a crank driven by the metering means and an oscillating arm engaged and driven by the crank in one direction to a fixed point of travel at one end of its path; a spring returning the arm; a pressure device responsive to the pressure of the metered fluid; mechanism acting in response to the device and varying the return movement of the arm as the pressure varies, said mechanism comprising a rocking plate having an edge having various radii adapted to vary the return movement of the arm; and means responsive to the movement of the arm and operating the register.

3. In a meter, the combination of a fluid volume metering means; a register; a ratchet mechanism for driving the register; an oscillating arm for driving the rachet mechanism; a crank driven from the metering means engaging and adapted to move the arm in one direction; a spring returning the arm; a plate having a working edge of varying radii, said working edge being in the path of the return movement of the arm; and a pressure device responsive to the pressure of the metered fluid actuating said plate.

4. A volumetric gas meter comprising an index and means to drive said index to indicate the volume flow of gas through the meter; a second index; driving means for said second index operatively connected to said first named index, said drive means comprising a cam mechanism and a clutch; pressure responsive means connected for response to supply pressure to control said cam mechanism to drive said second index by said clutch at a rate varied in accordance with pressure variations to correct the indication of said second index to a predetermined lower base pressure.

5. In mechanism adapted for connection to a volumetric gas meter, an index, means driven from said volumetric meter to drive the index to indicate the volume of gas passing through said meter regardless of pressure, a second index for indicating corrected pressure readings, pressure responsive means, and solely mechanical means for actuating said second index driven by said first mentioned means, and means between the first means and the second index controlled by said pressure responsive means for varying the driving increments to said second index to increase the reading thereof in accordance with pressure variations to indicate the corrected volume of gas passing through said meter reduced to a predetermined lower base pressure.

JOHN C. DIEHL.